Patented Mar. 2, 1948

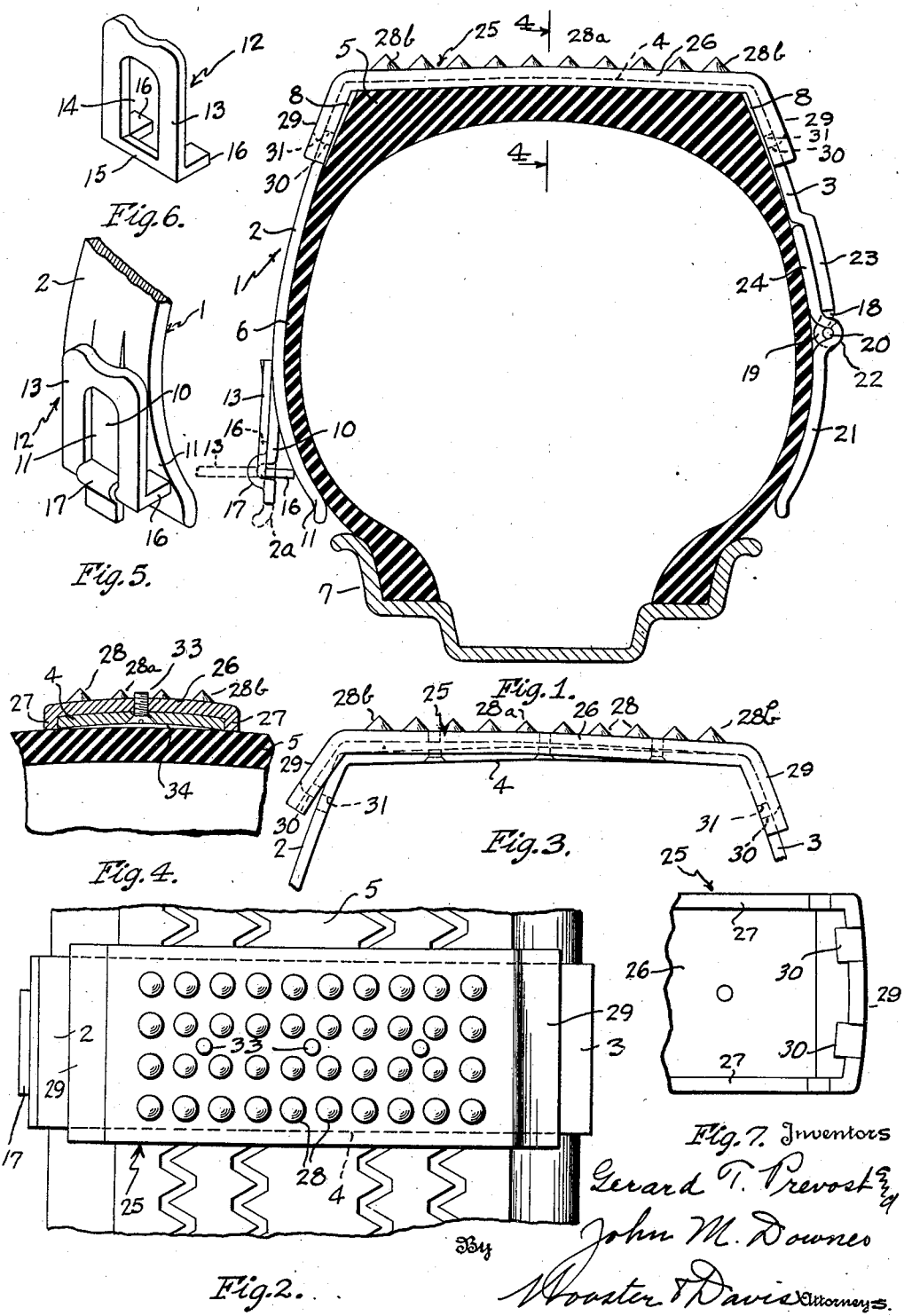

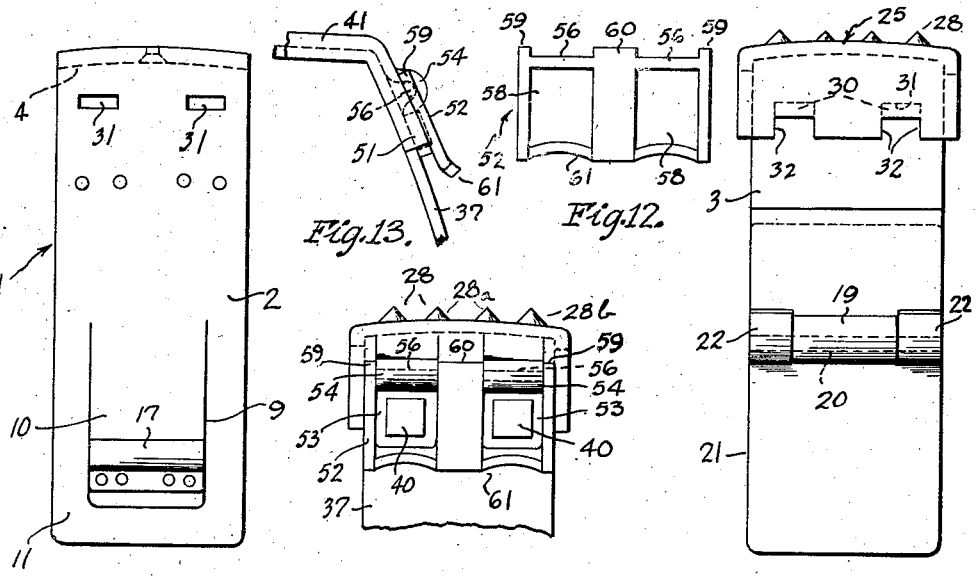

2,437,040

UNITED STATES PATENT OFFICE 2,437,040

NONSKID DEVICE FOR TIRES

Gerard T. Prevost and John M. Downes,
Bridgeport, Conn.

Application July 3, 1947, Serial No. 758,940

10 Claims. (Cl. 152—230)

This invention relates to a nonskid or antiskid device for vehicle tires, and has for an object to provide a device of this character which is of a simple and improved construction and which is clamped about and grips the tire in such a way that it is effectively held on the tire in operative position.

Another object is to provide a device of this character which is clamped on and grips the tire independently of the rim, and therefore does not require any element passing over the rim, and so can be used with disc wheels having no openings through them.

Another object is to provide a clamping device of this character, which is provided with a separate insert or tread element which will stand the wear in place of the clamp itself, and which may be readily renewed.

A further object is to provide an improved clamping means for this type of device.

With the foregoing and other objects in view, we have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 1 is a section through the casing of a tire and rim showing our improved nonskid device applied thereto, the inner tube of the tire being omitted;

Fig. 2 is a top plan view thereof;

Fig. 3 is a side view of the tread portion of the device illustrating how the insert or tread element may be removed and applied;

Fig. 4 is a section substantially on line 4—4 of Fig. 1;

Fig. 5 is a perspective view showing the clamping means;

Fig. 6 is a perspective view of the clamping element or cam lock;

Fig. 7 is a bottom plan of one end portion of the insert or tread element;

Fig. 8 is a side view of the device looking from the left of Fig. 1 but with the insert tread and the cam lock removed;

Fig. 9 is a view of the device looking from the right of Fig. 1;

Fig. 10 is a view similar to Fig. 1, omitting the tire and rim and showing a modified construction, also showing the release cam removed;

Fig. 11 is a detail view of the upper part of the device looking from the right of Fig. 10;

Fig. 12 is a view of the release cam removed from this device;

Fig. 13 is a side view of the upper portion showing this release cam in position;

Fig. 14 is a view looking from the right of Fig. 13;

Fig. 15 is a partial section of a tire casing and rim showing a portion of this device applied thereto with a modified form of cam lock, and Fig. 16 is a side view on a reduced scale showing how a number of these devices may be secured together.

Referring first to Figs. 1 to 9 inclusive, the device comprises a clamp in the form of a strap 1 which is of substantially U-shape, including the side legs 2 and 3 and the connecting bar 4. This is preferably a substantially flat (except for a transverse curvature for a purpose to be described later) metal strap which goes over the tread 5 of the tire 6 and extends down on opposite sides. The leg 3 extends below the greatest bulge of the tire and the leg 2 on the opposite side extends down to a short distance of the edge of the rim 7. This clamp or strap preferably follows closely the contour of the tire except on each side of the tread where a small space 8 is left for about an inch or so down each side to compensate for wear of the tread. Also the leg 2 normally follows the contour of the tire only down to about the greatest bulge on the side of the tire and below that extends in a substantially straight line, as indicated by the dotted line 2a of Fig. 1. The end portion of this leg is cut with a substantially U-shaped cut 9, as shown in Fig. 8, leaving a central tongue 10 and a substantially U-shaped integral leaf 11 forming a clamp which may be forced inwardly to engage and grip the side of the tire, as indicated in Fig. 1.

Different forms of clamping means may be used for this purpose, but a very simple and effective form is shown at 12 in Figs. 1, 5 and 6. This comprises a flat lever portion 13 provided with an opening 14 leaving a transverse bar 15, and on the inner side at the opposite ends of this bar are laterally extending cam lugs 16 which are preferably at an angle somewhat greater than a right angle to the body 13, so as when used to operate the clamp they will pass somewhat beyond the center to hold the clamp closed. For mounting this clamp the central tongue 10 is provided with an outwardly extending rib 17 forming a groove in which the bar 15 seats to pivotally mount the cam lock 12 on this tongue with the lugs 16 engaging the leaf portion 11. When the lever portion 13 is substantially horizontal, as shown in dotted lines Fig. 1, the lugs 16 are flat against the face of the leaf 11, and then when the lever is swung up to the full line position these lugs 16 act as cams to force the clamping leaf 11 against the side of the tire, as shown in full lines, Fig. 1. These lugs extend somewhat beyond the pivot 15, and therefore, the pressure of the leaf holds the cam lock in position. When swung in the opposite direction lever 13 releases the leaf or clamping portion 11 which swings outwardly away from the tire by resilient action of the metal to release the clamp.

The opposite leg 3, as previously indicated, extends down to or a short distance below the maximum bulge of the tire and is recessed on its opposite sides, as shown at 18, providing a central tongue 19 which is rolled over, as shown in Figs. 1 and 9, to mount a pivot pin 20. Mounted on this pin is a separate curved section 21, curved substantially to the contour of the tire and extending, as shown in Fig. 1, a substantial distance above and below the greatest bulge of the tire, it being offset at the central portion, as shown at 22 on opposite sides of the portion 19 to pivot this section 21 on the pin 20 and the clamp leg 3. A portion of the leg 3 is offset outwardly, as shown at 23, to receive the upper portion 24 of the section 21, as shown in Fig. 1, so that the inner surface of the pivoted section 21 is a substantial continuation of the inner surface of the leg 3 to follow the contour of the tire. This pivoted section 21 is to facilitate application and removal of the clamp to and from the tire. That is, in applying the clamp to the tire, as it is passed downwardly over the tire from the top as viewed in Fig. 1, the lower part of the section 21 below the pivot 20 will swing outwardly so as to slide down over the curved or bulged side of the tire, and the straight leg 2 will of course slide over the bulge on its side of the tire. As the clamp reaches its position against the tread the curved pivoted section 21 swings automatically to conform to the bulged side wall of the tire, and will cooperate with the integral clamping leaf 11 to grip the tire and effectively retain this device on the tire after the cam lock 12 has been swung to the clamping position. In releasing the device the cam lock 12 is first released by swinging the lever portion 13 downwardly and outwardly to the dotted line position of Fig. 1, permitting the clamping portion 11 to swing away from the tire under resilient action of the metal. Then the device may be readily lifted from the tire, the element 21 merely swinging on its pivot so that its free end will follow along the curvature of the side wall of the tire. With this arrangement it is not necessary to spring the U-shaped strap or force the side legs outwardly in applying the device to or removing it from the tire, but it readily slides on and off without requiring such springing action.

To take wear of the device on the pavement off the connecting bar portion 4, a separate insert or tread element 25 is provided removably fastened over the bar 4 to enclose and protect it and to take this wear. This comprises a transversely curved member 26 to seat over the bar 4 and provided with side flanges 27 to extend over the opposite edges of the bar 4, as shown in Fig. 4. On its outer surface it is provided with a series of lugs or projections 28 forming calks or grips to engage the pavement and form a nonskid tread. These may be of different shape, but are preferably substantially conical, as shown. As the clamp and insert are curved somewhat to conform to the curvature of the tread, it is preferred to gradually increase the height of the lugs or calks 28 from the center towards the sides and ends, as shown at 28a and 28b, so the tips of these lugs are substantially in the same plane or level and provide a uniform grip on the road. For securely fastening this insert to the clamp or strap 1, it extends at its opposite ends downwardly over the side legs 2 and 3, as shown at 29, and is provided with any suitable number of inturned lugs 30, in the present case two on each side, seating in openings or slots 31 in the legs 2 and 3 of the clamp. These lugs can be readily formed by slitting the ends 29 inwardly from their edges, as indicated at 32 in Fig. 9, and then bending the intermediate portions inwardly. The member 25 has sufficient spring so that after one set of lugs 30 are inserted, for example, in the leg 3, as shown in Fig. 3, the opposite end is snapped down over the opposite portion of the leg 2, as indicated in Fig. 3, to bring the lugs 30 at this end into the opening 31 after which the spring action will hold the insert in place, but to obviate any possibility of its becoming loose or detached in use it is preferred to also secure it to the bar 4 by any suitable number of screws 33.

Instead of having the clamp or strap 1 curved transversely to correspond to the curvature of the tire tread, it is curved transversely on a considerably smaller radius, as shown in Fig. 4, so that its inner surface 34 is on a considerably smaller radius than the radius on the outer tread of the tire. This leaves a space between the clamp and the tire which may be filled by the rubber from the tread when the weight is on the device to hold the device from slipping backwardly or forwardly on the tire. This lateral curvature also adds to the strength of the device.

In Figs. 10 to 14 is shown a somewhat modified construction, preferably for heavy duty use, although the same construction may be used for lighter duty. In this case, the cam lock corresponding to the element 12 of Figs. 1, 5 and 6, instead of being made as a separate element is made as a part of the tread or insert element corresponding to the member 25. In this form the clamp or strap 35 is substantially the same as that of Fig. 1 having side legs 36 and 37 and the connecting bar 38, but in this form instead of having the openings 31 in the strap, it is provided with a pair of outwardly extending lugs 39 and 40 fastened on the legs 36 and 37 respectively by any suitable means, such, for example, as welding, and the insert or tread member 41 corresponding to member 25 is provided with openings 42 and 43 to receive these lugs. The outer or left hand end of this insert 41 is carried down over the bulge of the tire and over the leg 36 of the clamp, as shown at 44, and is shaped the same as the element 12 of Figs. 1, 5 and 6, in that it is provided with an opening 45 corresponding to the opening 14, leaving a pivot bar 46 at the lower edge thereof to seat in the groove on the inner side of the rib 47 corresponding to the rib 17 of the first form in the central tongue 48 corresponding to the tongue 10 of the first form. At the opposite sides of this bar 46 are provided laterally extending cam lugs 49 corresponding to the lugs 16 to engage the integral leaf or clamp 50 shaped the same and corresponding to the leaf 11 of the first form for clamping it to the tire. On the opposite leg 47 is pivotally mounted the curved section 21 the same as in the first form.

In applying this device the insert 41 is swung outwardly or to the left as viewed in Fig. 10, and as suggested by the dotted lines, about the pivot bar 46, swinging the cam lugs 49 outwardly, so that the clamping portion 50 lies in the plane of the central tongue 48, the same as in the device of Fig. 1. Then after the clamp has been placed over the tire this member 41 is swung inwardly or to the right as shown in Fig. 10 to the full line position shown, and snapped over the lugs 39 and 40, the spring action holding it in this position. This action also presses the lugs 49 against the clamping portion 50 and forces it inwardly to clamp it against the side of the tire the same as described in connection with lugs 16 and leaf 11 in Fig. 1.

However, as this is a heavy duty and therefore of heavier construction, means is preferably provided to assist in releasing the end portion 51 from the holding lugs 40. The end portion 51 is slit inwardly from its free edge, as shown at 52, to provide spring tongues 53 in which the openings 42 are formed, and immediately above these openings each tongue is offset outwardly with a transverse rib 54 forming a pivot groove 55 on its inner side to receive the pivot bars 56 of a small cam 57 (Figs. 12, 13 and 14). This bracket can be made of a metal plate of suitable thickness with openings 58 cut in it to receive the tongues 53 and form the pivot bars 56. At the opposite ends of these bars are lugs 59 and 60 passing beyond the bars, and at the other end are provided with a hand grip 61. This cam is mounted on the outer face of the end portion 51, as shown in Figs. 13 and 14 (it being omitted from Figs. 10 and 11 so the construction of the end of insert member 41 may be more clearly shown), with the pivot bars 56 in the grooves 55, and the lugs 59 and 60 lying on the face of the end portion 51 at the opposite sides of and between the tongues 53. Now when it is desired to release the member 41, by merely swinging the lower free end 61 of the cam outwardly and upwardly, as shown in Fig. 13, the cam lugs 59 and 60 will press against the outer surface of the end portion 51 and the pivot bars 56 will raise the tongues 53 off of and release them from the lugs 40, thus releasing this end of the insert 41 and permitting it to be swung over to the left to release the cam lugs 49 and the portion 50, and permit the whole device to be easily removed from the tire. This releasing cam 57 may, if desired, be applied to either end of the insert element 25 of the form of Figs. 1 and 3, to facilitate release of the insert element of this form, but as in this case the insert is usually a lighter element and furthermore is not required to be released to release the clamp, it is usually omitted from the form of Figs. 1 and 3.

Fig. 15 shows a slightly different form of cam lock for clamping the device against the tire. It may be used in place of the cam lock 12 in Figs. 1 to 5, and comprises the element 62. This element is mounted in the tongue 10 so as to swing down to clamp the leaf clamp 11, instead of upwardly as in Fig. 1. For this purpose it is provided with an opening 62a forming a pivot bar 63 seating in the groove in the rib 17, and then extends inwardly at 64 and is then inclined inwardly and downwardly at 65 with a curved cam 66 to engage the outer portion of the clamp leaf 11 and terminating in a lever or hand grip 67. When this lever or hand grip is swung outwardly to the dotted line position 15, the cam releases the clamping portion 11 so it lies in the plane of the tongue 10 as shown in dotted lines, and by swinging the lever 67 downwardly and inwardly toward the rim the cam forces the portion 11 inwardly against the tire to clamp the device.

It will be seen from the above that this provides a simple nonskid or antiskid device which may be quickly and easily applied to and removed from the tire, that when in position on the tire it is clamped firmly in position so as to retain its proper position on the tire and prevent its sliding longitudinally. The main wear is on a separate element which may be readily removed and renewed. Any desired number of these devices may be applied to the tire and at any suitable spacing, and each may be used individually if desired. A number (specifically two or more) of these devices may, however, be connected by any suitable means, such, for example, as by a series of separate links 68, 69, as shown in Fig. 16, these being preferably metal bars or straps secured to the individual clamps by any suitable means such, for example, as rivets or welding, and they are sufficiently flexible to permit the small relative movement between the separate clamps incident to flexing or yielding of the tire in its rolling action. These connecting bars, however, are not necessary and may or may not be employed, as found desirable. They may be used between two or more of the antiskid clamps, as is found preferable.

Having thus set forth the nature of our invention, we claim:

1. A nonskid device for vehicle tires comprising a clamp including a substantially U-shaped member to extend over the tread and the opposite sides of the tire, one of the side portions being slit to provide a tongue and an integral clamping leaf, and a cam lock pivotally mounted on the tongue and including a laterally extending cam member engaging the leaf and adapted on swinging movement of the cam lock to swing the leaf inwardly and clamp it against the tire.

2. A nonskid device for vehicle tires comprising a clamp including a strap having legs to extend at the opposite sides of the tire and a connecting bar over the tread, the free end portion of one of the legs being slit to provide a supporting portion and a clamping portion, a member pivotally mounted on the supporting portion including a lever portion and a cam portion, the cam portion adapted on swinging movement of the lever portion to shift the clamping portion inwardly toward the side of the tire and clamp it against the tire to clamp the device on the tire.

3. A nonskid device for vehicle tires comprising a substantially U-shaped strap including legs to engage the sides of the tire and a connecting bar over the tread, one of said legs being slit to provide a central tongue and a substantially U-shaped clamping leaf surrounding the tongue, an angularly shaped clamping lever pivoted to the tongue and provided with laterally extending cam lugs located to lie alongside of the leaf portion when the lever is swung outwardly and to engage said leaf portion when the lever is swung inwardly to press said leaf against the side of the tire to clamp the device thereon.

4. A nonskid device for vehicle tires comprising a clamp including a strap member provided with spaced legs to lie on opposite sides of the tire and a connecting bar over the tread, one of siad legs being provided with a clamping means to clamp against the side of the tire, the other leg including a concavely curved section to engage the side of the tire and pivoted intermediate its length at about the greatest bulge in the side of the tire to permit its free end portion to swing outwardly and follow over the surface of the side wall as the device is removed outwardly from the tire.

5. A nonskid device for vehicle tires comprising a clamp including a strap member provided with spaced legs to lie on opposite sides of the tire and a connecting bar over the tread, one of said legs being provided with a clamping means to clamp against the side of the tire, and a complementary clamping section pivoted to the other leg to clamp against the opposite side of the tire, said clamping section comprising a member concavely curved to substantially fit the side of the tire and pivoted intermediate its length to the leg adjacent the greatest bulge in the tire so that as the device is removed outwardly from the tire this section will swing on its pivot to allow its free end to follow the contour of the tire.

6. A nonskid device for vehicle tires comprising a clamp including a strap member provided with spaced legs to engage opposite sides of a tire and a connecting bar to pass over the tread, manually operable means on one leg to clamp the legs against the sides of the tire, and an insert tread member including a body portion over the connecting bar and side flanges over the opposite edges of the bar, the opposite end portions of the tread member extending over the outer portions of the legs, and said end portions and the legs being provided with cooperating lugs and openings to hold the insert member on the clamp by spring action of the tread member.

7. A nonskid device for vehicle tires comprising a clamp including a strap member provided with spaced legs to lie on opposite sides of the tire and a connecting bar over the tread, one of said legs being provided with a clamping means to clamp against the side of the tire, said connecting bar being curved transversely on its inner surface on a radius considerably less than the radius of the tire tread so as to grip the tread to prevent lateral slipping of the bar, and an insert tread member on the outer side of and embracing the edges of said bar and provided with gripping lugs to engage the road surface.

8. A nonskid device for vehicle tires comprising a clamp including a strap member provided with spaced legs to lie on opposite sides of the tire and a connecting bar over the tread, one of said legs being provided with a clamping means to clamp against the side of the tire, said clamping means including a supporting section and an integral flexible leaf on said leg, a clamping lever pivoted to the supporting section and provided with a lateral cam lug to engage the leaf to clamp it against the tire as the lever is shifted toward the tire, and said lever being extended to pass over the connecting bar of the clamp to form an insert tread, and cooperating means on said extension and the clamp to secure the lever in clamping position.

9. A nonskid device for vehicle tires comprising a clamp including a strap member provided with spaced legs to engage opposite sides of a tire and a connecting bar to pass over the tread, one of said legs being cut to form a supporting section and an integral movable clamping section to engage a side of the tire, a clamping lever pivotally mounted in the supporting section and including an arm and a laterally extending cam lug adapted to engage the clamping section to clamp it against the tire as the lever arm is shifted toward the tire, said arm being extended along the side of the leg and over the connecting bar to form an insert tread and provided with road-gripping lugs, and means for detachably securing the insert tread to the clamp.

10. A nonskid device for vehicle tires comprising a clamp including a strap member provided with spaced legs to engage opposite sides of a tire and a connecting bar to pass over the tread, manually operable means on one leg to clamp the legs against the sides of the tire, an insert tread member including a body portion over the connecting bar provided with road gripping lugs, said tread member including portions overlapping the outer portions of the leg members adjacent the connecting bar, said overlapping portions and the leg members being provided with cooperating lugs and openings to hold the tread member in position by spring action of said member, and a cam lever pivoted to one of said members and adapted to force an end of the tread member outwardly to separate the adjacent lugs and openings.

GERARD T. PREVOST.
JOHN M. DOWNES.